April 25, 1961 C. A. FLOOD 2,981,432

INDICIA-APPLYING APPARATUS

Filed April 17, 1958 10 Sheets-Sheet 1

Inventor
Carl A. Flood
by Roberts, Cushman & Grover
Att'ys

Inventor
Carl A. Flood
by Roberts, Cushman & Grover
Attys

Inventor
Carl A. Flood
by Roberts, Cushman & Grover
Attys

Inventor
Carl A. Flood
by Roberts, Cushman & Grover
Attys

Inventor
Carl A. Flood
by Roberts, Cushman & Grover
Att'ys

Inventor
Carl A. Flood
by Roberts, Cushman & Grover
Attys

INDICIA-APPLYING APPARATUS

Filed April 17, 1958 10 Sheets-Sheet 7

Inventor
Carl A. Flood
by Roberts, Cushman & Grover
Att'ys

Inventor
Carl A. Flood
by Roberts, Cushman & Grover
Att'ys

Inventor
Carl A. Flood
by Roberts, Cushman & Grover
Attys

Inventor
Carl A. Flood
by Roberts, Cushman & Grover
Att'ys 2,981,432

INDICIA-APPLYING APPARATUS

Carl A. Flood, Framingham, Mass., assignor to Dennison Manufacturing Company, Framingham, Mass., a corporation of Massachusetts Filed Apr. 17, 1958, Ser. No. 729,216

12 Claims. (Cl. 216—2)

This invention relates to apparatus for applying indicia to articles such as bottles, strips of wrapping material, etc. by means of an applicator such as a printer or a label-supplying device. In many cases it is desirable to have the label strip and/or the article to which the indicia is to be applied travel at an average speed more or less than that of the applicator. For example in transferring labels from a label strip on which the labels are closely spaced to a strip of wrapping material on which the labels are widely spaced, it is desirable to have the label strip and wrapping strip travel at average speeds respectively lesser and greater than that of the applicator. Heretofore this has been accomplished by feeding one strip or the other or both intermittently. This is undesirable because of the recurrent starting and stopping of the strip.

Objects of the present invention are to eliminate the intermittent feed and instead merely vary the speed of the continuously feeding strips in the region of the applicator while maintaining the speed constant in other portions of their paths. Other objects are to make the variable speed readily adjustable so that, by simple adjustment, it may be either increased or decreased or even reversed in the region of the applicator while maintaining constant uniform speed in the remaining portions of the paths of the strips. Still other objects are to provide a machine readily adaptable to apply indicia to different articles such as bottles of different shapes, strips of sheet material, etc.

In one aspect the present invention involves means for continuously feeding a strip of flexible sheet material at a predetermined speed past an indicia-applying station along a predetermined path including a portion extending from a point in advance of the station to a point beyond the station, together with an applicator at the station for applying indicia to the strip at recurrent locations along the strip, means for intermittently causing the applicator to apply indicia to the strip at said locations during recurrent intervals, and means for changing the speed of the strip in the aforesaid portion between the aforesaid intervals while maintaining the predetermined speed in other portions of its path. The last means should include a strip guide at each of the aforesaid points for changing the direction of strip travel as the strip enters and leaves the aforesaid portion together with means for synchronously moving the guides lengthwise of the portion. In the aforesaid portion the speed of the strip may be either increased or decreased or that portion of the strip may be stopped.

In a more specific aspect the invention involves means for continuously feeding two strips of flexible sheet material at different speeds past a label-applying station along predetermined paths each including a portion extending from a point in advance of the station to a point beyond the station, together with an applicator at the station for transferring labels from one strip to the other at recurrent locations along the strips, the locations being spaced differently on the two strips respectively, means for intermittently causing the applicator to transfer successive labels from one strip to the other during recurrent intervals and means for synchronizing the speed of the strips in the aforesaid portions of their paths during said intervals by changing the speed of at least one strip in the aforesaid portion of its path between said intervals while maintaining the aforesaid predetermined speed in other portions of its path.

In another aspect the invention involves means for feeding a strip of labels along a predetermined path past a label-applying station, means at the aforesaid station on one side of the path for supporting an article, at the aforesaid station on the other side of the path an applicator movable with the strip for pressing the strip against the article, and means for feeding the label-receiving surface of the article past the aforesaid station in synchronism with the applicator, so that the label is applied to the article progressively as the label passes the aforesaid station, the feeding means including an oscillatory part which moves back and forth to feed the strip past the station in synchronism with the applicator.

In still another aspect the apparatus comprises a main assembly for applying indicia and a sub-assembly for moving an article past the indicia-applying station, the sub-assembly being detachable as a unit so as to be readily replaced with other subassemblies for handling other kinds of articles.

For the purpose of illustration typical embodiments of the invention are shown in the accompanying drawings in which:

Fig. 1 is a front elevation of a machine for applying heat-transfer labels from a label strip to cylindrical collapsible bottles;

Fig. 1*a* is a plan view of a label strip;

Fig. 21 is a view like Figs. 1, 14 and 17 showing a modified sub-assembly for use in transferring labels from a label strip to a strip of wrapping material or the like;

Fig. 22 is a diagram showing the speeds of the applicator, the label strip and the strip to which the labels are to be transferred throughout two complete cycles of operation during which two labels are transferred;

Fig. 23 is a view like Fig. 21 showing a modification of printing on a strip of wrapping material or the like instead of transferring labels thereto;

Fig. 24 is a view like Fig. 22 showing the speed of the strip of wrapping material throughout two complete cycles;

Figure 1:
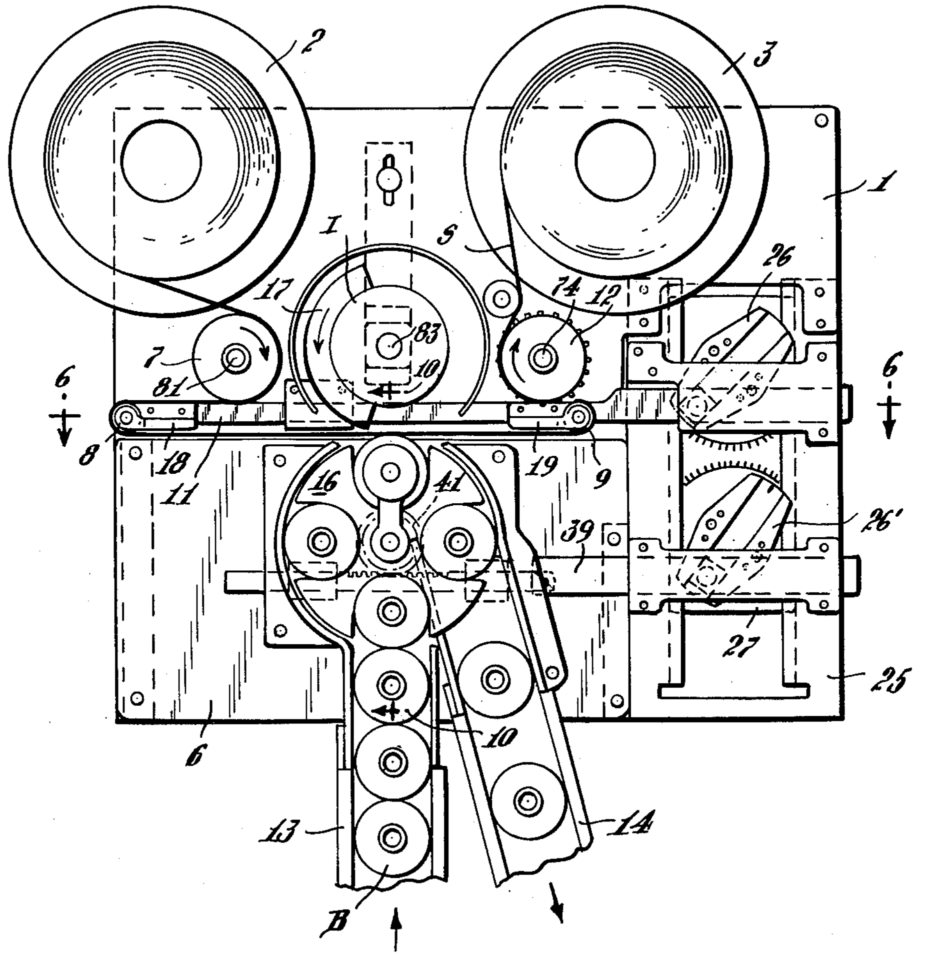

While Figs. 1, 14, 17, 21 and 23 have been described as front elevations, obviously the machines could be used in various positions in one of which these views would be plans instead of elevations.

The particular embodiment of the invention illustrated in Figs. 1 to 12 is especially adapted to transfer labels from a strip to bottles. While any heat-transfer label strip S may be employed, the strip is preferably made as disclosed in application Ser. No. 558,129, filed January 9, 1956 and as illustrated in Fig. 1*a* where the label strip comprises a paper backing having a marginal row of sprocket holes H, the backing being coated with oxidized wax adhesively to hold the labels L printed on the wax coating with ink which is heat-activatable so that when a label is pressed against a bottle or other article by means of a hot iron engaging the back of the strip S the label is transferred from the strip to the article.

As shown in Figs. 1 to 12 the machine comprises a main frame 1 carrying the mechanism for feeding a label strip S from the feed roll 2 to a take-up reel 3 past an applicator I in the form of a rotary heat-transfer iron and a sub-frame 6 carrying mechanism for feeding cylindrical bottles B past the label-applying station on the side of the label strip S opposite the iron I. The label strip feeds over an idler roll 7, thence over two rolls 8 and 9 at opposite ends of a reciprocating carriage 11 and thence over a sprocket wheel 12 which meshes with the perforations in the margin of the label strip (Figs. 1*a* and 4) and rotates at a constant continuous speed. The bottles B are fed to and from the label-applying station through chutes 13 and 14. At the label-applying station is a turret 16 having peripheral recesses to receive individual bottles. In the feed chute 13 the bottles are pressed against the turret so that a bottle enters each empty recess as the recess passes the chute and as each bottle reaches the delivery chute 14 it is discharged through the chute. When the chutes are directed downwardly the bottles fall into the delivery chute 14 by gravity, but if the machine is positioned so that the bottles are upright the bottles may be fed to and from the turret by a conveyor belt in each chute as indicated at 15 in Fig. 10. The iron I has a raised portion 17 whose circumferential length is preferably equal to the length of each label and as explained in detail hereinafter the labels are fed to the label-applying station in synchronism with the rotating iron so that the leading edge of the raised portion 17 engages the leading edge of a label and as the two progress in unison the label is pressed against the bottle at the label-applying station, the bottle being rotated in synchronism with the iron as hereinafter described so that each label is applied to a bottle progressively.

When the carriage 11 is stationary the label strip S is advanced by the drive roll 12 at a constant continuous speed. However with the labels juxtaposed on the label strip as shown in Fig. 1*a* the advance of the label strip past the label-applying station should be arrested after each bottle has been labeled while the next bottle is being brought into position to be labeled. This is accomplished by moving the carriage back and forth lengthwise of that portion of the path of the label strip extending from roller 8 to roller 9.

Figure 6:
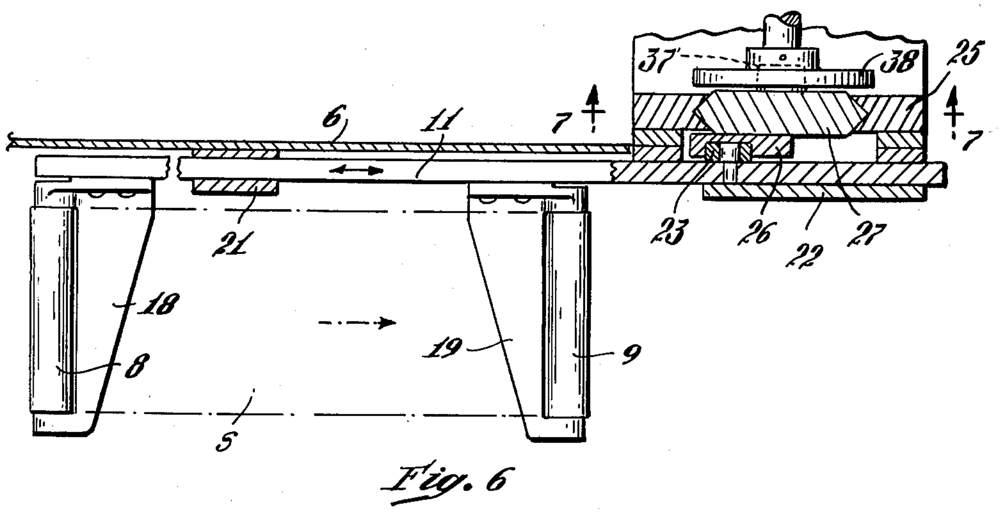
Fig. 6 is a section on line 6—6 of Fig. 1.
Figure 8:
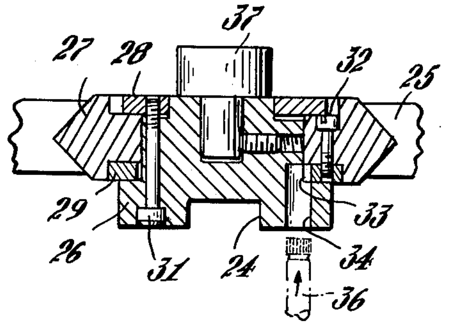
Fig. 8 is a section on line 8—8 of Fig. 7.
Figure 7:
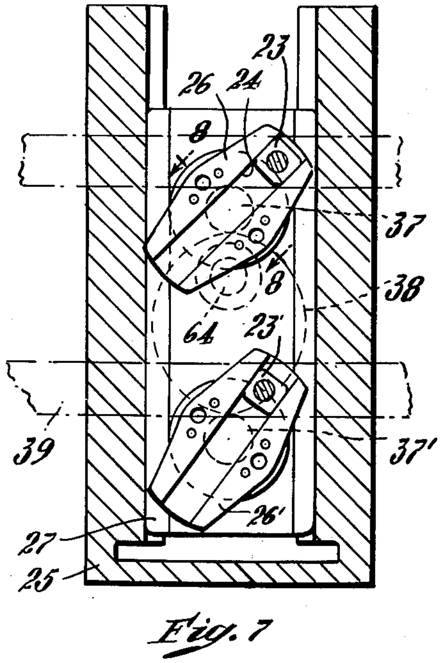
Fig. 7 is a section on line 7—7 of Fig. 6.
Figure 9:
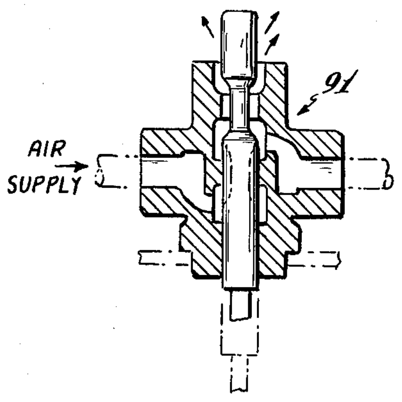
Fig. 9 is a section of a valve for supplying air to the collapsible bottles while the labels are being applied.

As shown in Fig. 6 the carriage 11 carries the rollers 8 and 9 by means of two brackets 18 and 19, the carriage sliding in two guides 21 and 22. Mounted on the rear side of the carriage is a cam follower 23 sliding in a slot 24 on the front side of an adjustable cam 26 which is rotatably mounted in a slide 27 which slides vertically in a U-shaped guide 25 fast to frame 1, (Figs. 6, 7 and 8). The cam is held in adjusted position by means of two rings 28 and 29 and two sets of screws 31 and 32 (Fig. 8). To assemble the parts the screws 32 are first threaded into the ring 29 after which the ring 28 and screw 31 are applied. The inner periphery of the ring 29 is provided with teeth 33 and the front face of the cam 26 is provided with a socket 34 in line with the teeth so that a pinion 36 may be engaged with the teeth 33 to rotate the cam 26 thereby to vary the angle of the cam slot 24 with the vertical. To make this adjustment the screws 31 are loosened and the key 36 is rotated while in engagement with the teeth 33. Inasmuch as the screws 32 hold the ring 29 against rotation the cam block 26 rotates as the pinion 36 travels along the gear 33. After the desired adjustment is obtained the screws 31 are again tightened to hold the cam block in adjusted position. Mounted on the rear face of the cam block 26 is a cam follower 37 engageable with a cam 38.

Figure 1A:
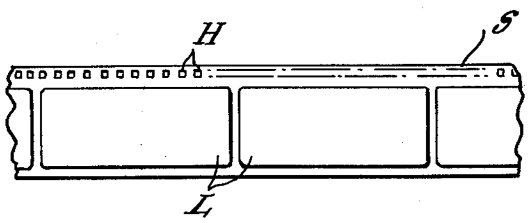

The bottle turret 16 is actuated by a similar cam block 26' similarly mounted on the lower end of the slide 27 and carrying a similar cam follower 37' (Figs. 1 and 7). A cam 38 bridges the space between the cam followers 37 and 37' positively to move the slide 27 back and forth. The cam block 26' is connected with the bottle turret through a cam follower 23', a rack 39 and a pinion 41. The mode of operation of the adjustable cam blocks 26 and 26' will be described hereinafter in connection with Figs. 22 and 24 to 30.

Figures 2, 3:
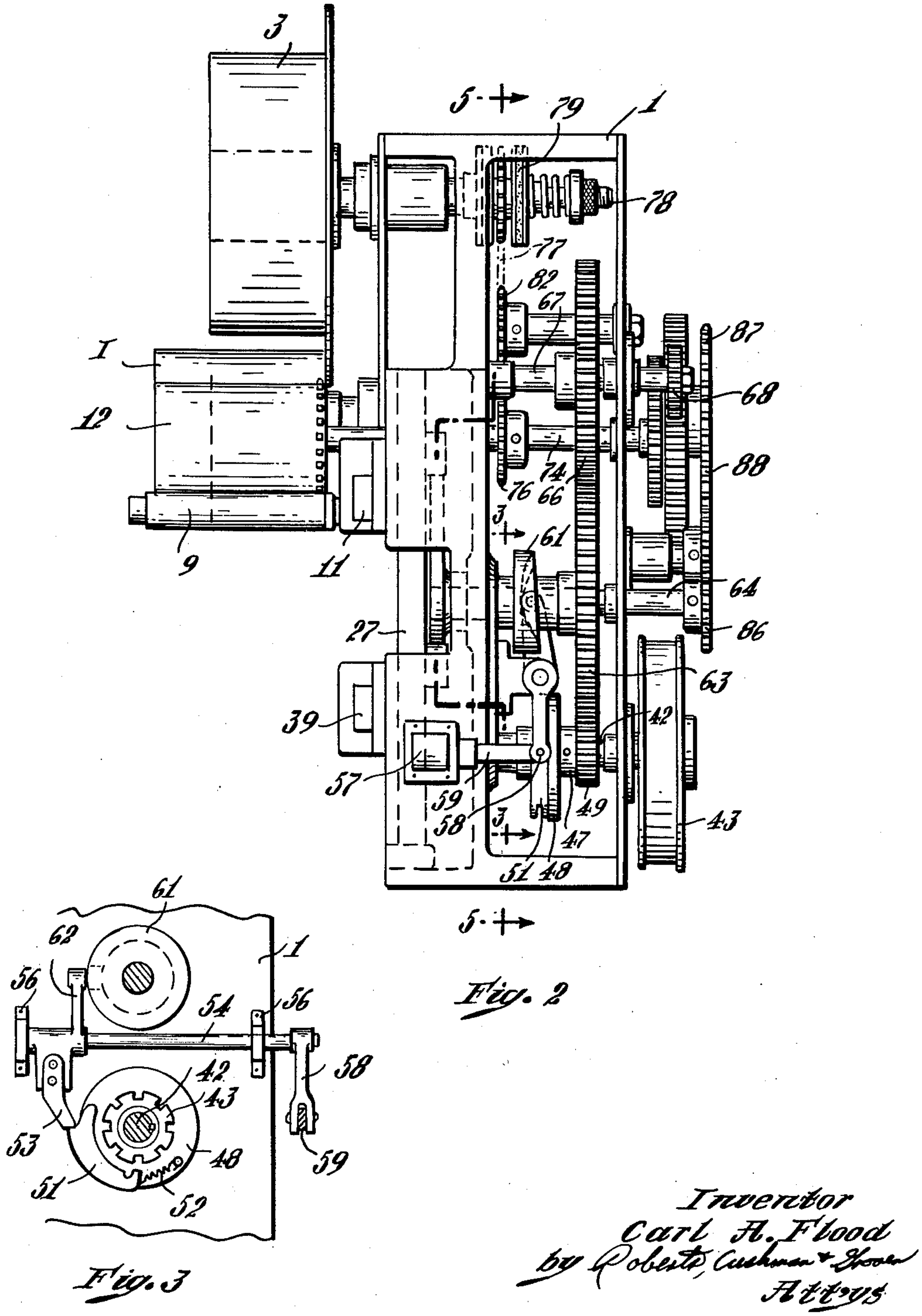
Fig. 2 is an end view from the right of Fig. 1.
Fig. 3 is a section on line 3—3 of Fig. 2.
Figure 4:
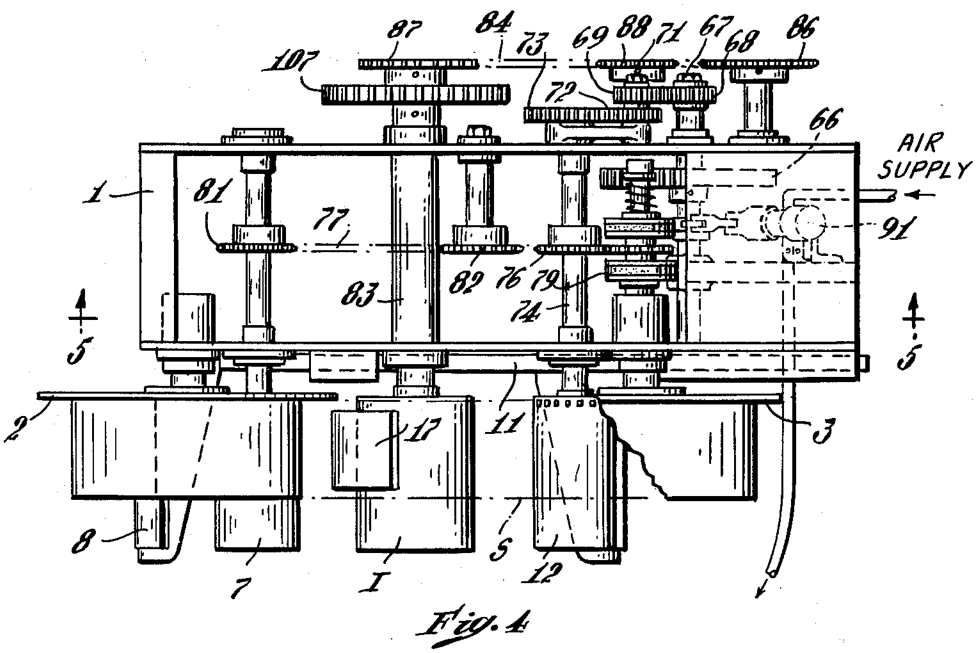
Fig. 4 is a top plan view of the same machine.
Figure 5:
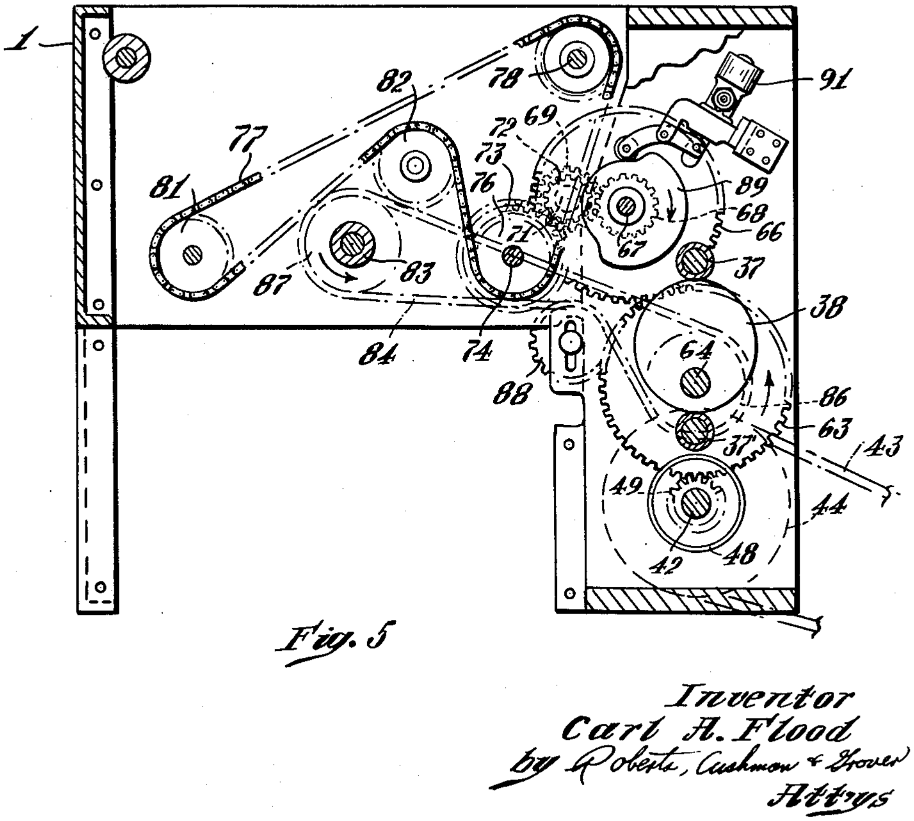
Fig. 5 is a section on line 5—5 of Fig. 4.

As shown in Figs. 2, 3, 4 and 5 the aforesaid mechanism is actuated as follows: Fast to the shaft 42 is a ratchet wheel 43 and a pulley 44 driven by a belt 46 (Figs. 3 and 5). Rotatably mounted on the shaft 42 is a sleeve 47 comprising a disc 48 and a gear 49. Pivotally mounted on the side of the disc 48 is a dog 51 (Fig. 3) which is normally held in engagement with the ratchet wheel by means of a spring 52, thereby to drive the disc 48 and pinion 49. To stop the machine the dog 51 is disengaged from the ratchet wheel 43 by means of an arm 53 on a shaft 54 journaled in bearings 56. The shaft 54 is controlled by a solenoid 57 (Fig. 2) through the medium of an arm 58 and link 59. The shaft is also controlled by the cam 61 and arm 62 which prevents the shaft 54 from moving the arm 53 into the path of the dog 51 until the machine reaches the end of a cycle in well-known manner.

When the clutch is thrown the gear 49 drives gear 63 on shaft 64, gear 63 drives gear 66 on shaft 67. Fast to the shaft 67 is a gear 68 which drives gear 69 on shaft 71. On shaft 71 is a gear 72 which drives gear 73 on shaft 74. Also fast to shaft 74 is a sprocket wheel 76 which drives a sprocket chain 77, which drives shaft 78 for actuating the take-up reel 3 through a friction clutch 79 (Figs. 2 and 4) and the label strip roll 7 through a sprocket wheel 81, the chain being kept taut by an idler wheel 82. The iron I is mounted on shaft 83 driven by sprocket chain 84 trained over sprocket wheels 86 and 87 on shaft 64 and 83, the chain 84 extending over an adjustable idler sprocket 88. Mounted on the shaft 67 is a cam 89 for controlling a valve 91 arranged to supply air under pressure to the interior of collapsible bottles while being labeled.

Figure 10:
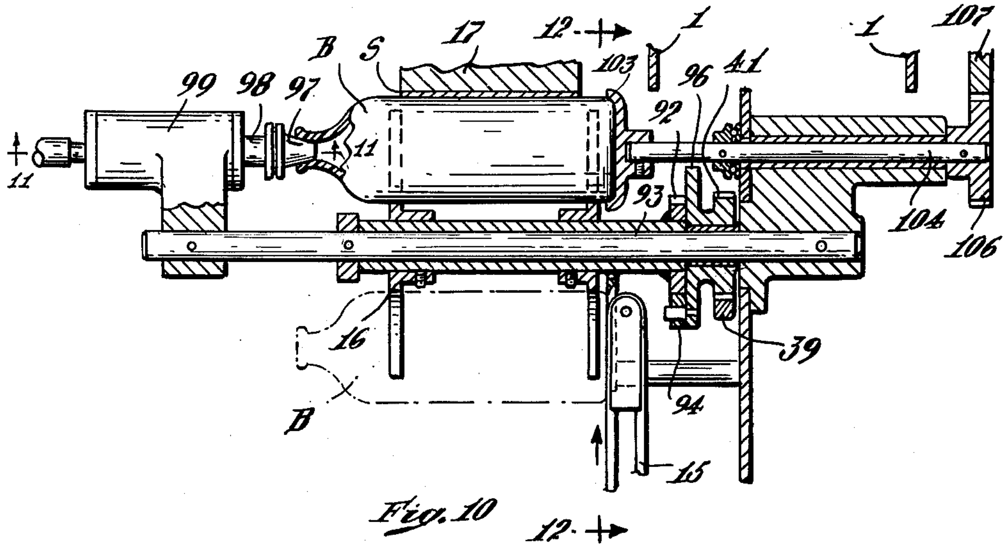
Fig. 10 is a section on line 10—10 of Fig. 1.
Figure 12:
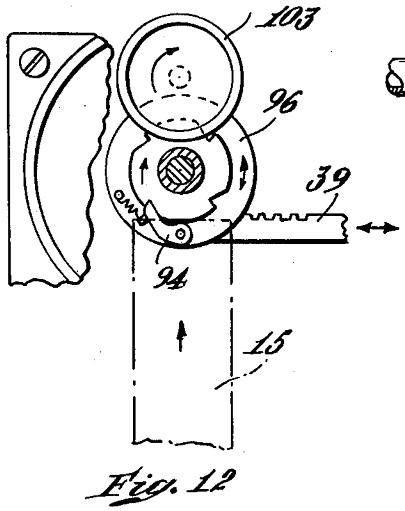
Fig. 12 is a section on line 12—12 of Fig. 10.

As shown in Figs. 10 and 12 the rack 39 turns the bottle turret intermittently, successively to bring the bottles directly under the iron I. This is accomplished by a ratchet wheel 92 fast to the turret shaft 93, the wheel being actuated by a dog 94 pivotally mounted on the side of a sleeve 96 which is oscillated back and forth by the rack 39.

Figure 11:
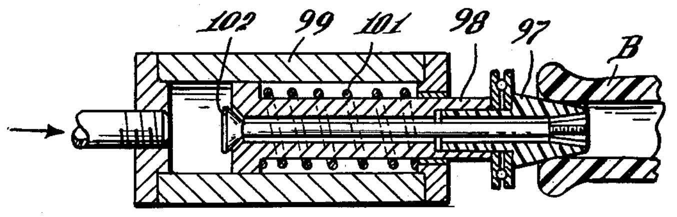
Fig. 11 is a section on line 11—11 of Fig. 10.

The mechanism for inflating collapsible bottles while being labeled comprises a nozzle 97 rotatably mounted in the end of a plunger 98 projecting from an air cylinder 99 (Figs. 10 and 11). The plunger is normally held in retracted position by a spring 101, but when air is admitted to the cylinder the plunger is advanced to seat the nozzle 97 in the mouth of the bottle at the label-applying station. In lieu of spring 101 of course, a double-acting piston and cylinder can be used. The nozzle 97 is slidably mounted in the plunger 98 and carries a valve 102 which is opened when the nozzle engages the mouth of a bottle. Fast to the nozzle 97 is a ball bearing ring which minimizes the friction between the nozzle and the plunger when the bottle is rotated during the application of a label. Opposite the nozzle 97 is a rubber cup 103 to counteract the thrust of the nozzle. The cup is mounted on a shaft 104 carrying a pinion 106 which meshes with gear 107 on the iron shaft 83 (Figs. 4 and 10) thereby to rotate the bottle in synchronism with the iron while the label is being applied.

Figure 13:
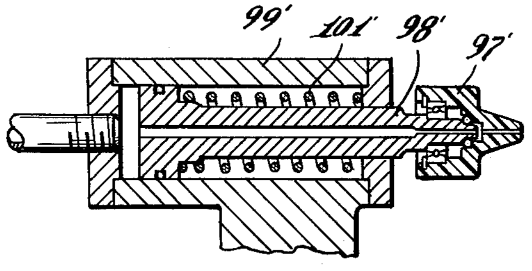
Fig. 13 is a section similar Fig. 11 showing a modification.

The modified air nozzle shown in Fig. 13 comprises a rotary nozzle 97', plunger 98', a cylinder 99' and a spring 101' corresponding to the parts similarly designated in Fig. 11. However the valve 102 is omitted.

Figure 14:
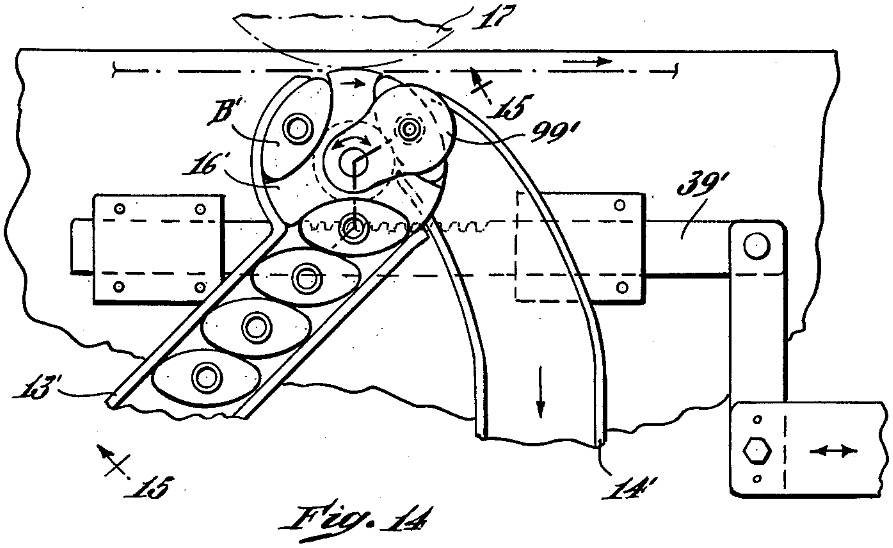
Fig. 14 is a view like Fig. 1 showing a sub-assembly for handling oval bottles instead of cylindrical bottles.
Figure 15:
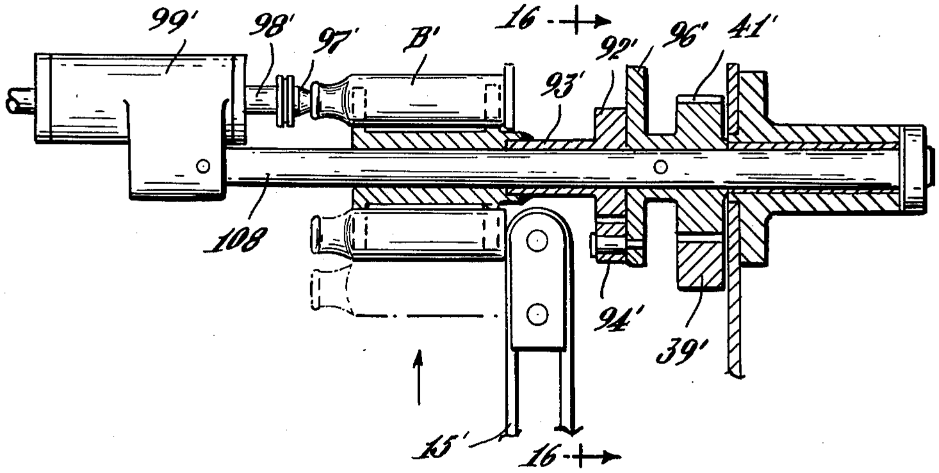
Fig. 15 is a section on line 15—15 of Fig. 14.
Figure 16:
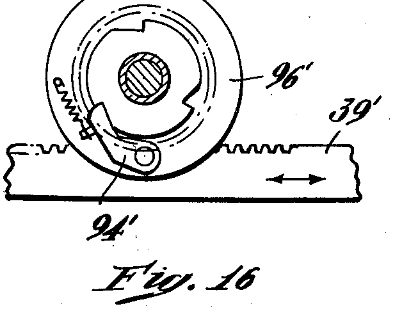
Fig. 16 is a section on line 16—16 of Fig. 15.

The modification shown in Figs. 14, 15, and 16 is similar to that shown in Figs. 1 to 12 and corresponding parts are correspondingly designated. However it is arranged to apply labels to oval bottles. The turret 16' is shaped so that the outer surfaces of the bottles B' are concentric with the axis of the rotor and the turret is intermittently advanced at the same rate as the iron I so that each label is progressively applied to a bottle as the bottle passes the label-applying station. In this case the turret comes to rest not while the bottle is stopped at the label-applying station as in the preceding embodiment but after a bottle has passed the station and another bottle has not yet reached the station. The air cylinder 99' is fast to a shaft 108 which in turn is keyed to the oscillating sleeve 41'—96'. Thus the air cylinder oscillates back and forth between the advanced position shown in Fig. 14 and a retracted position opposite the opposite bottle B' which has not yet reached the iron. In this case the cam 89 (Fig. 5) will turn the air on when the cylinder is in retracted position and turn it off again when the cylinder reaches the advanced position shown in Fig. 14. In this way the air pressure in the bottle keeps it from being collapsed while the label is being applied to it.

Figure 17:
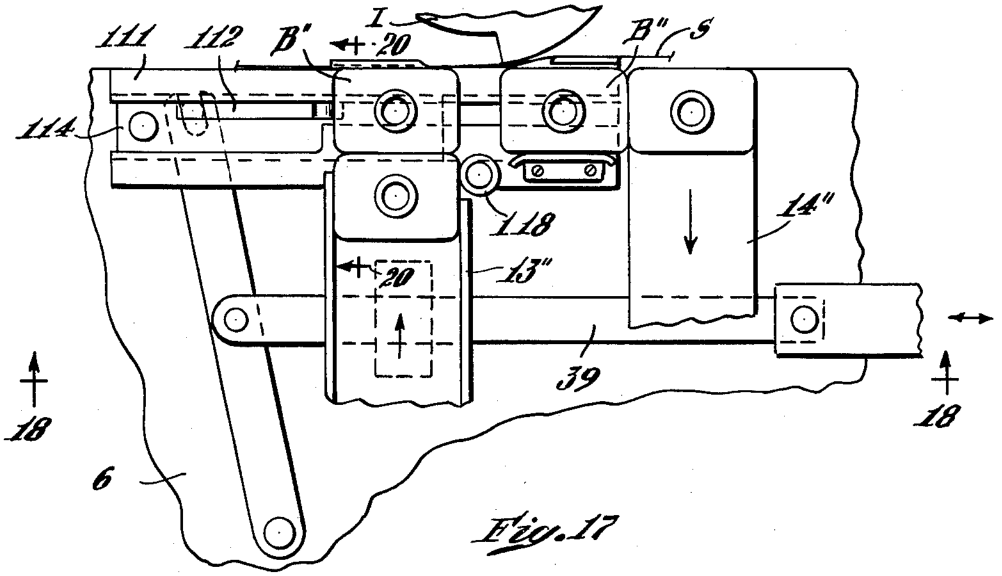
Fig. 17 is a view like Figs. 1 and 14 for applying labels to rectangular collapsible bottles.
Figure 18:
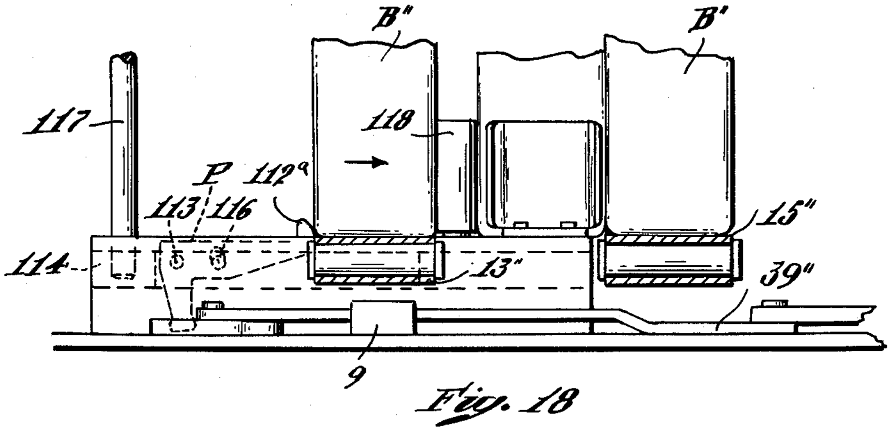
Fig. 18 is a section on line 18—18 of Fig. 17.
Figure 20:
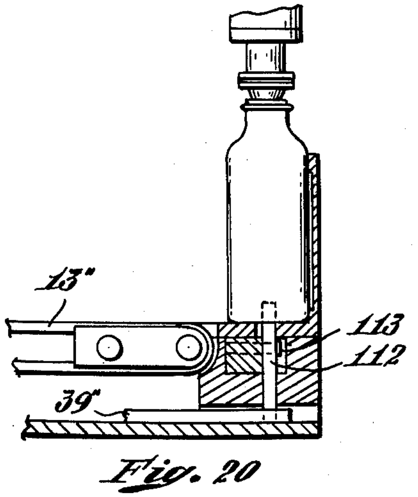
Fig. 20 is a section on line 20—20 of Fig. 17.
Figure 19:
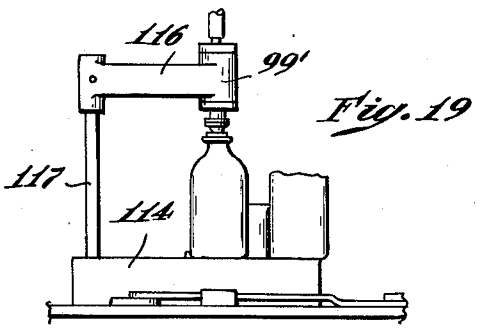
Fig. 19 is a view like Fig. 18 on a smaller scale and showing additional parts.

The embodiment shown in Figs. 17 to 20 is like the preceding embodiments except in that it is adapted to apply labels to bottles B'' which are rectangular in cross-section. Here again the parts corresponding to certain parts in the preceding embodiments are correspondingly designated. Extending along the label strip S is a guideway 111 along which the bottles are guided past the label-applying station. The bottles are fed into the guideway through chute 13'' and away from the guideway through chute 14''. The bottles are pushed along the guideway by means of a dog 112 pivotally mounted at 113 on a block 114 sliding in the guideway. A pin 116 extends through a slot in the dog to limit its angular movement about the pivot 113. The dog and block are moved back and forth by a slide 39'' corresponding to 39 of the first embodiment. Inasmuch as the dog 112 is L-shaped its nose **112*a* is moved up to engage a bottle when the slide 39'' moves to the right (Fig. 18), and, when the slide moves to the left, it swings down far enough to clear the bottle on the return stroke. Here the cam block 26' (Figs. 1 and 7) would of course be set to move each bottle past the label-applying station at the same speed as the iron so that the label is progressively applied to the bottle as it passes the station. In the case of collapsible bottles air is admitted to each bottle while its label is being applied. In this case the air cylinder 99' is mounted on an arm 116 extending laterally from a post 117 fast to the block 114. As shown in Figs. 17 and 18 a guide roller 118** should be located on the side of the bottle guideway opposite the iron I to hold each bottle in contact with the iron as it passes by.

Figures 21, 22, 23, 24:
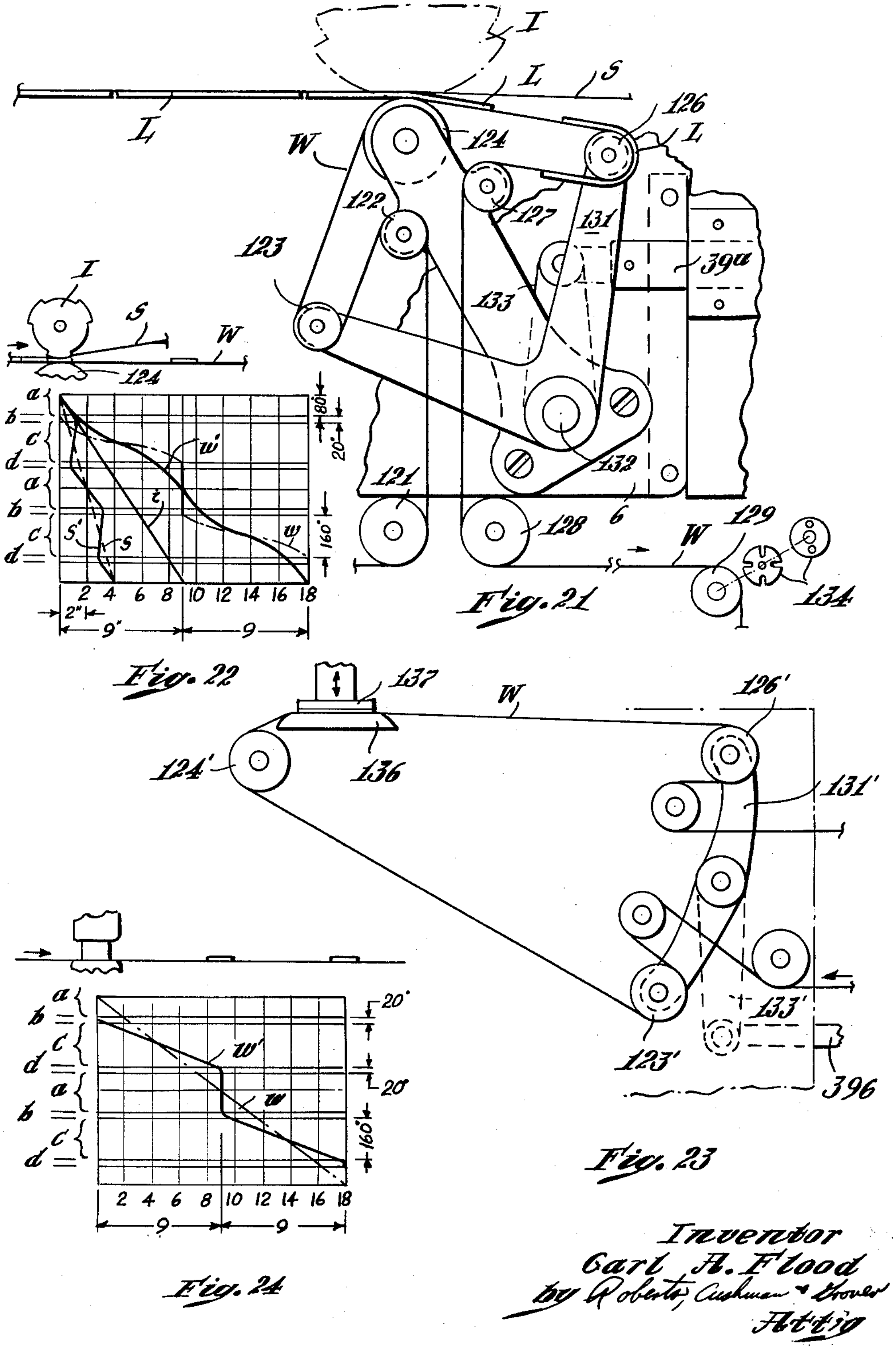

The modification shown in Fig. 21 is like that of the preceding embodiments in that it comprises a rotary iron I for transferring labels L from a strip S to an article, such as a strip of wrapping material W which is fed past the label-applying station over rollers 121, 122, 123, 124, 126, 127, 128 and 129. The rollers 123 and 126 are mounted on a V-shaped rocker arm 131 pivotally mounted on a shaft 132. Fast to the shaft is another arm 133 which is connected to a reciprocating slide **39*a* corresponding to 39 at Fig. 1. In this case the cam block 26' is set so that the rocker 131 advances that portion of the strip W between rolls 123 and 126 at the same speed as the label strip and iron while the label is being transferred to the strip W. During these advances of the aforesaid portion of the strip W the other portions of the strip remain stationary and between these intermittent advances of the aforesaid portion of the strip the strip is advanced intermittently by any suitable means as for example a Geneva movement such as shown diagrammatically at 134** in Fig. 21.

The modification shown in Fig. 23 is like that shown in Fig. 21 in that it has a rocker arm 131 carrying rolls 123' and 126' which, as the arm 131' oscillates back and forth, changes the speed of that portion of the strip W extending from the roll 123' to 126' over roll 124' past a platen 136 and a printing head 137 which reciprocates up and down to print on the strip W at recurrent intervals. Here the cam 26' (Fig. 7) is adjusted to stop that portion of the strip W between rolls 123' and 126' during each printing operation while the rest of the strip W continues to move at constant speed.

Figure 26:
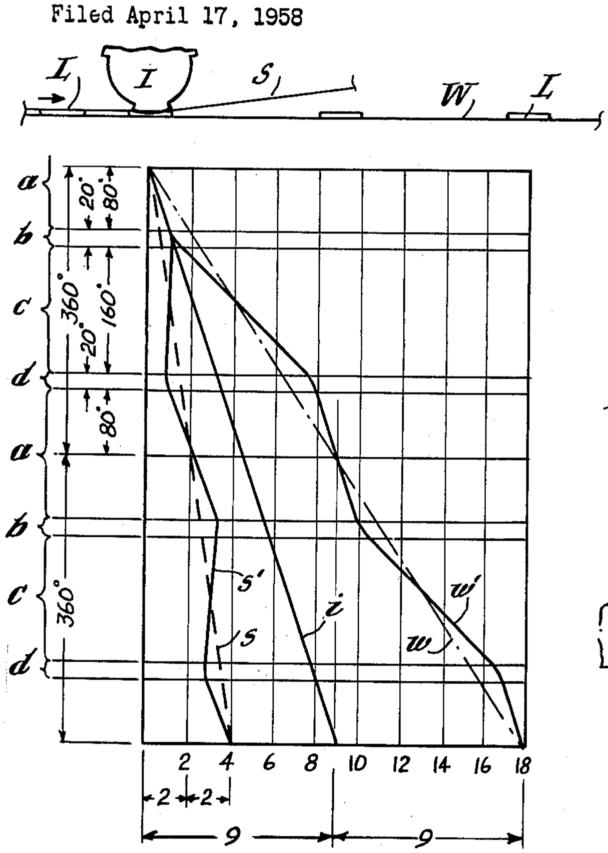
Fig. 26 is a diagram like Fig. 22 showing the speeds of the parts when the change-speed mechanism is adjusted as shown in Fig. 25.
Figure 25:
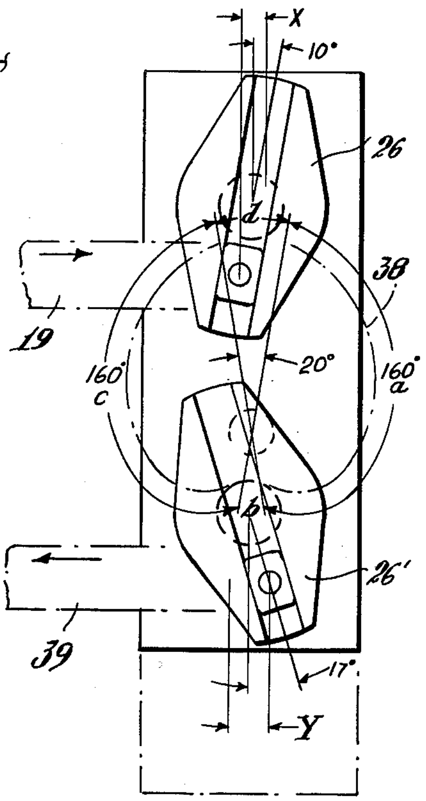
Fig. 25 is a diagrammatic view of the change-speed mechanism shown at the lower right-hand corner of Fig. 1 and in Fig. 7.
Figure 27:
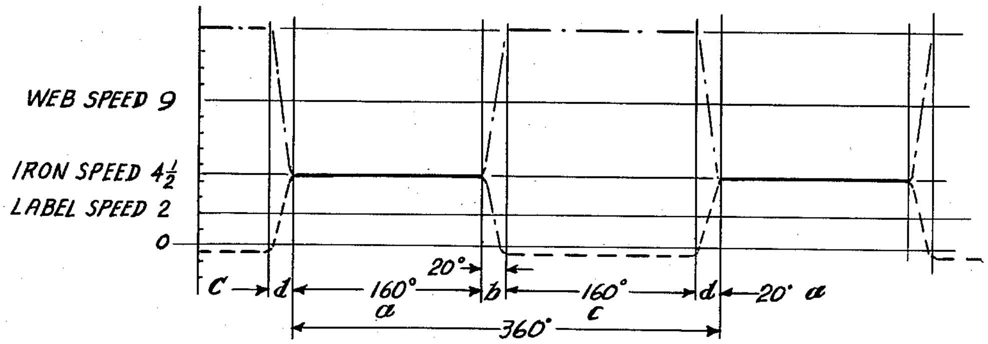
Fig. 27 is a diagram showing the speeds of the parts in a different way when the change-speed mechanism is adjusted as shown in Fig. 25.
Figure 29:
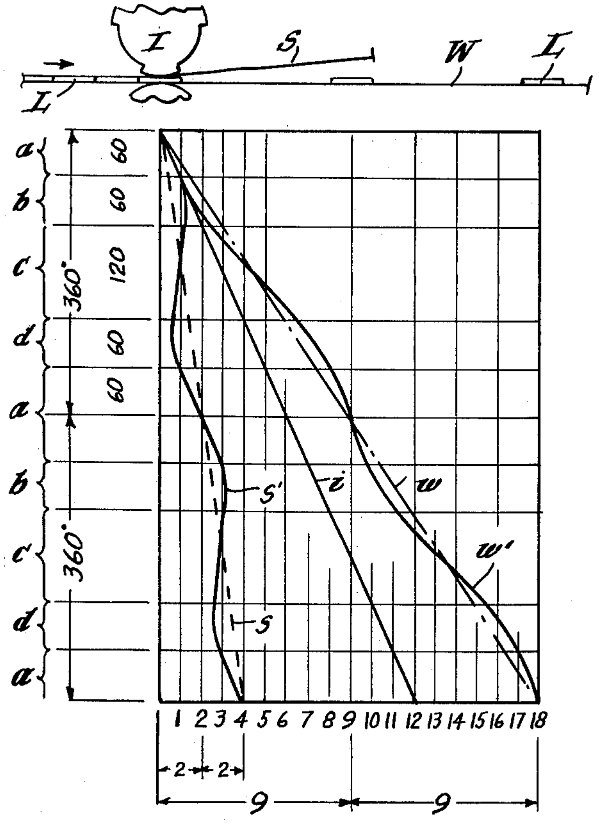
Fig. 29 is a diagram like Fig. 26 showing the speeds when the change-speed mechanism is adjusted as shown in Fig. 28.
Figure 28:
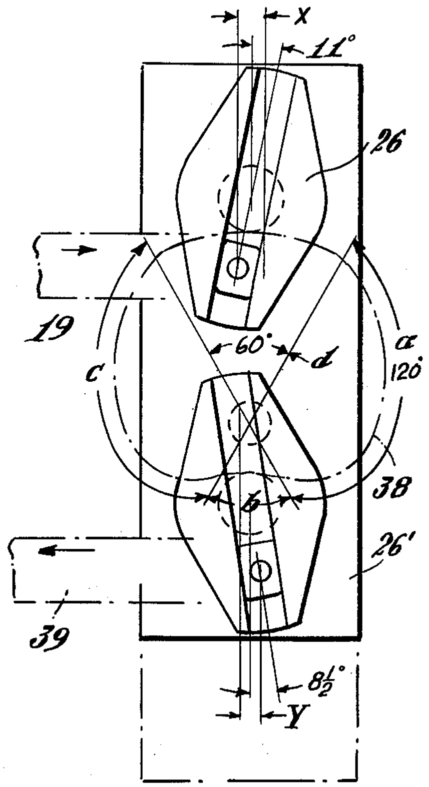
Fig. 28 is a view like Fig. 25 showing the change-speed mechanism differently constructed to vary the speeds of the two strips differently.

As shown in Figs. 25 and 28 the cam 38 is heart-shaped, rotates counter-clockwise and is divided into four sectors *a*, *b*, *c*, and *d*. Throughout sector *a* the oscillator 19 moves to the right (Figs. 1, 25 and 28) at constant speed, throughout sector *b* the movement of the oscillator is reversed, throughout sector *c* the ocsillator moves to the left at constant speed and throughout sector *d* the movement of the oscillator is again reversed. The same is true of oscillator 39 except in that it moves to the left while 19 moves to the right as indicated by the arrows in Figs. 25 and 28. The label is applied while either sector *a* or *c* is moving the oscillators at constant speed, and in the two examples illustrated in Figs. 25 to 27 on the one hand and Figs. 28 to 30 on the other hand it is while sector *a* is operative to move 19 to the right and 39 to the left. Hereinafter this sector *a* during which the label is transferred is referred to as the transfer arc of cam 38. The iron should advance through one cycle while the cam 38 makes a complete revolution. Thus an iron cycle is 360° for a single iron such as shown in Figs. 1, 4 and 21, 180° for a double iron, and 120° for a triple iron such as shown in Figs. 26 and 29. For use with the same label lengths, the circumference of a double iron should be twice that of a single iron and the circumference of a triple iron should be three times that of a single iron so that the cycles arcs are the same lengths in all three cases. The circumferential extent of iron 17, herein called the iron arc, must not be greater than the transfer arc because the iron should be operative only during the intervals when the label strip and article to be labeled are moving at the same speed as the iron in the transfer zone, that is the zone in which the oscillators affect the speed of the label strip and article to be labeled. Thus for the example shown in Figs. 28 to 30 where angles *a* and *c* are 160° and angles *b* and *d* are 20° the iron arc should not be greater than 4/9 of a cam cycle, that is 4/9 of 360° equals 160° for a single iron, 4/9 of 180° equals 80° for a double iron and 4/9 of 120° equals 53⅓° for a triple iron. During transfer, the ratio of iron travel to the constant-speed label travel outside the transfer zone must be at least the inverse of the ratio of the transfer arc to the complete cam cycle.

In the example shown in Figs. 25 to 27 the angles are *a*–160°, *b*–20°, *c*–160° and *d*–20°, the speed of the iron is 4½, and the constant speeds of the label strip S and web W (Fig. 21) outside the transfer zone are 2 and 9 respectively, all speeds being in inches per cycle. Figs. 25 and 26 each shows two complete cycles. In Fig. 27 the angles are plotted as abscissa and the speeds as ordinates. In the transfer zone, during period *d*, the oscillator 19 increases the speed of the label strip S from 2 to 4½ and the oscillator 39 decreases the speed of the web W, from 9 to 4½ so that the three speeds are equal during transfer period *a*. During period *b* the label speed is decreased to −½ and the web speed is increased to 13½, thereby to maintain the average speeds in the transfer zone 2 and 9 respectively, the same as outside the transfer zone.

In Fig. 26, where the angles are plotted as ordinates and the distances traveled as abscissa, the curves relate to the movements as follows: *i* the iron; *s* the motion imparted to the label strip S by the constant-speed sprocket 12; *s'* the motion of the label strip in the transfer zone as modified by the oscillator 19; *w* the motion of the article, such as a web W of wrapping material driven by a constant-speed drive instead of the Geneva movement of Fig. 21 for example; and *w'* the motion of the web as modified by the oscillator **39*a***. Throughout each sector *a* the curves *i*, *s'* and *w'* are parallel which means that the iron, label strip and web are traveling at the same speed. The curves also indicate that the iron travels 9 inches during two cycles or 4½ inches during one cycle, while traveling at the same speed during the transfer period, the iron, strip and web each travels 4/9 (160/360) of the cycle length of the iron (4½") which is 2 inches, the length of a label.

The throw of the oscillators may be determined by the following formulae where *i*, *s* and *w* indicate distances traveled while a label is being transferred, *i* of the iron, *s* of the label strip in the constant-speed portion of its path outside the transfer zone, and *w* of the article to be labeled in the constant-speed portions of its path outside the transfer zone, *x* is the throw of the label strip oscillator 19 and *y* is the throw of the article-feed oscillator 39. Where the constant speed of the strip and article are less than that of the iron the formulae are: $i-s=2x$; $2x/2=x$; $i-w=2y$; and $2y/2=y$. Where the constant speed of the strip and article are greater than that of the iron the formulae are: $s-i=2x$; $2x/2=x$; $w-1=2y$; and $2y/2=y$. From the curves in Fig. 26 it appears that $i=2$, $s=8/9$ and $w=4$. Thus by the above formulae $x=5/9''$ and $y=1$ inch and the cam blocks 26 and 26' should be set at the proper angles to produce these throws. As shown in Fig. 25 these angles are approximately 10° and 17° respectively.

Figure 30:
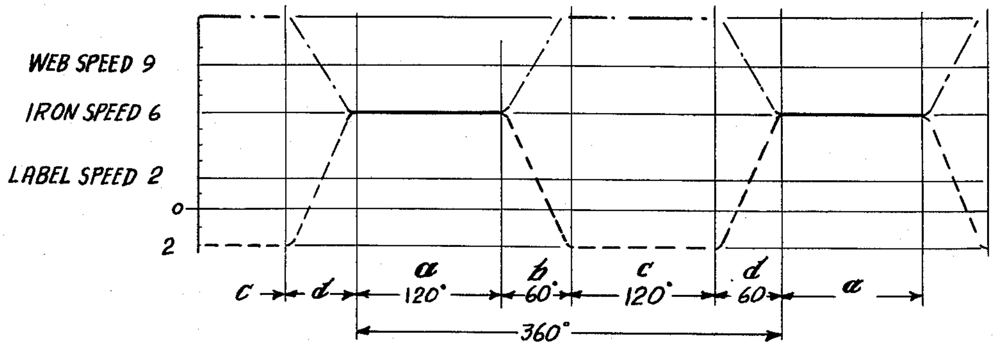
Fig. 30 is a view like Fig. 27 showing the speeds of the parts in a different way when the change-speed mechanism is adjusted as shown in Fig. 28.

Figs. 28 to 30 are like Figs. 25 to 27 except in that the transfer arc *a* is 120° instead of 160° so that, in the aforesaid formulae, $i=2$ as before but $s=2/3$, $w=3$, $x=2/3$ and $y=1/2$. In this case the iron arc should not be greater than ⅓ of a cam cycle. To produce these throws of the oscillators the cam blocks should be set at about 11° and 8½° respectively as shown in Fig. 28.

The chart of Fig. 22 shows the performance of the modification of Fig. 21, which is the same as in chart 26 so far as the iron and label strip are concerned. However, with the Geneva drive 134 the web W would follow the curve *w* if the oscillator **39*a* were stationary and with the cam block 26'** set as in Fig. 25 the web travel follows the curve *w'*.

Fig. 24 shows the results of Fig. 23 with the cam block 26' set to reduce the speed of web W to zero during the printing intervals *a*.

From the foregoing it will be evident that any one of the sub-frames 6 of the various modifications of Figs. 1 to 12, 14 to 16, 17 to 20, 21 and 23 may be applied to the main frame 1 in the open space shown at the bottom of Fig. 5 as illustrated in Fig. 1. It will also be evident that during transfer the oscillators 19 and 37 may oscillate in the same direction as in Figs. 1 and 7 or opposite directions as in Figs. 25 and 28, and that the throw of each oscillator may be adjusted independently of the other. Thus during transfer either the label strip or the article being labeled may be decelerated, accelerated or stopped.

It should be understood that the present disclosure is for the purpose of illustration only and that this invention includes all modifications and equivalents which fall within the scope of the appended claims.

I claim:

1. A machine of the character referred to comprising means for continuously feeding a strip of flexible sheet material at a predetermined speed past an indicia-applying station along a predetermined path including a portion extending from a point in advance of said station to a point beyond the station, an applicator at said station for applying indicia to the strip at recurrent locations along the strip, means for intermittently causing the applicator to apply indicia to the strip at said locations during recurrent intervals, and means for changing between said intervals the speed of that part of the strip which occupies said portion while maintaining said predetermined speed in parts of the strip which simultaneously occupy other portions of the strip path.

2. A machine of the character referred to comprising means for continuously feeding a strip of flexible sheet material at a predetermined speed past an indicia-applying station along a predetermined path including a portion extending from a point in advance of said station to a point beyond the station, an applicator at said station for applying indicia to the strip at recurrent locations along the strip, means for intermittently causing the applicator to apply indicia to the strip at said locations during recurrent intervals, and means for changing between said intervals the speed of that part of the strip which occupies said portion while maintaining said predetermined speed in parts of the strip which simultaneously occupy other portions of the strip path, said last means being adjustable so that the speed of the strip may be changed as desired.

3. For applying labels to articles, a machine comprising feeding means for feeding a label carrier strip along a predetermined path past a label-applying station, supporting means at said station on one side of the path for supporting an article, at said station on the other side of the path an applicator movable with a uniform speed of its active surface for pressing the strip against the article to transfer a label from the strip to the article, moving means for moving the label-receiving surface of the article past said station in synchronism with said applicator so that the label is applied to the article progressively as the label passes said station, said strip feeding means including a primary feeding element continuously operating at uniform speed materially less than that of the applicator for determining the general rate of feed of the strip, and oscillatory means engaging the strip in advance of and beyond the applicator to accommodate the speed of the strip to that of the applicator and label-receiving surface of the article, said feeding and moving means each comprising an oscillator, the two oscillators being movable back and forth in the same general direction, said driving means comprising a third oscillator movable past the first two oscillators transversely of said direction, and kinematic means interconnecting the third oscillator with the other two to drive them in synchronism.

4. For applying labels to articles, a machine comprising feeding means for feeding a strip of labels along a predetermined path past a label-applying station, supporting means at said station on one side of the path for supporting an article, at said station on the other side of the path an applicator movable with the strip for pressing the strip against the article, and means for moving the label-receiving surface of the article past said station in synchronism with said applicator so that the label is applied to the article progressively as the label passes said station, said feeding means including an oscillatory part which moves back and forth to feed the strip past said station in synchronism with said applicator, and said article moving means comprising a sub-assembly which is detachable as a unit so as to be readily replaceable with other sub-assemblies for other kinds of articles, the machine including driving means for the oscillatory part and driving means for the article moving means, each of said driving means being individually adjustable as to stroke and within a range of adjustment defining uniform motion of its having openings therein, a machine comprising feed 5. For applying indicia to hollow collapsible articles having openings therein, a machine comprising feed means for feeding the articles successively to an application station, a rotatable applicator for transferring indicia from a strip to the articles at said station, fluid-pressure means to inflate each article while receiving indicia at said station, including a projectable and retractable nozzle engageable with the article, said nozzle when projected communicating with the interior of the article through the opening thereof and closing said opening against communication of the interior with the atmosphere, means for automatically projecting the nozzle, means for supplying fluid under pressure to the nozzle, a movable member opposed to the nozzle and against which the projected nozzle forces the article, means for moving said opposed member with the article forced thereagainst during the transfer of the indicia while maintaining the article surface substantially tangent to the active surface of the rotatable applicator, and means for automatically retracting the nozzle after the transfer.

6. A machine according to claim 1 further characterized in that said means for changing the speed of the strip comprises a strip guide at each of said points for changing the direction of strip travel as the strip enters and leaves said portion and the machine has means for synchronously moving said guides lengthwise of said portion.

7. A machine according to claim 1 further characterized in that said means for changing the speed of the strip includes a strip guide at each of said points for changing the direction of strip travel approximately 180° as the strip enters and leaves said portion of the path of the strip and the machine has means for synchronously moving said guides lengthwise of said portion.

8. For applying labels to articles, a machine comprising means for feeding a label carrier strip along a predetermined path past a label-applying transfer station, said feeding means being driven to advance said strip at a substantially steady speed at said feeding means, said path including a portion extending from a point in advance of said station to a point beyond the station, the label carrier persisting as a continuous strip after passage through said portion, at said station on one side of the path an applicator movable at a predetermined speed different from a predetermined substantially steady speed of the parts of the label carrier strip which occupy the strip path beyond said portion for pressing the strip against areas to be labeled, at said station on the other side of the path means for movably supporting said areas to move at said predetermmined speed, means for causing the applicator to transfer labels from the strip to said areas successively during recurrent intervals, and means for synchronizing the speed of the part of the strip in said portion with said predetermined applicator speed during said intervals without changing the substantially steady speed of parts of the same continuous label strip which simultaneously occupy the strip path beyond said portion.

9. A machine according to claim 8 further characterized in that said synchronizing means comprises a strip guide at each of said points for changing the direction of strip travel as the strip enters and leaves said portion and the machine has means for synchronously moving said guides lengthwise of said portion.

10. For applying labels to articles, a machine comprising means for feeding a label carrier strip along a predetermined path past a label-applying transfer station, said feeding means being driven to advance said strip at a substantially steady speed at said feeding means, said path including a portion extending from a point in advance of said station to a point beyond the station, the label carrier persisting as a continuous strip after passage through said portion, at said station on one side of the path an applicator movable at a predetermined speed different from a predetermined substantially steady speed of the parts of the label carrier strip which occupy the strip path beyond said portion, for pressing the strip against areas to be labeled, at said station on the other side of the path means for movably supporting said areas to move at a speed different from that of the applicator along a predetermined path including a portion extending from a point in advance of said station to a point beyond the station, means for causing the applicator to transfer labels from the strip to said areas successively during recurrent intervals, and means for synchronizing the speeds of the strip and areas in said portions of their respective paths with said predetermined speed during said intervals without changing their speeds in other portions of their paths.

11. A machine according to claim 10 further characterized in that the speed of the label strip outside the said portion of its path is less than said predetermined speed and the speed of said areas outside the said portion of their path is greater than said predetermined speed.

12. A machine according to claim 3 further characterized by driving means for the oscillatory means having, throughout transfer of the label, a uniform motion in the direction of strip travel.

References Cited in the file of this patent

UNITED STATES PATENTS

| | | |
|---|---|---|
| 2,120,505 | Nif Ong | June 14, 1938 |
| 2,303,525 | Craig | Dec. 1, 1942 |
| 2,323,691 | Von Hofe | July 6, 1943 |
| 2,329,034 | Buck et al. | Sept. 7, 1943 |
| 2,344,185 | Tuthill | Mar. 14, 1944 |
| 2,684,775 | Von Hofe | July 27, 1954 |
| 2,827,873 | Thorn | Mar. 25, 1958 |

FOREIGN PATENTS

| | | |
|---|---|---|
| 24,382 | Great Britain | 1913 |
| 368,405 | Great Britain | Mar. 10, 1932 |

UNITED STATES PATENT OFFICE

CERTIFICATE OF CORRECTION

Patent No. 2,981,432 April 25, 1961

Carl A. Flood

It is hereby certified that error appears in the above numbered patent requiring correction and that the said Letters Patent should read as corrected below.

Column 8, line 67, beginning with ", said feeding and moving" strike out all to and incuding "them in synchronism", in lines 73 and 74, same column 8; column 9, line 20, for "having openings therein, a machine comprising feed" read -- respective driven element in the direction of strip feed. --.

Signed and sealed this 28th day of November 1961.

(SEAL)
Attest:

ERNEST W. SWIDER
Attesting Officer

DAVID L. LADD
Commissioner of Patents

USCOMM-DC